United States Patent [19]

Okada et al.

[11] Patent Number: 4,562,116

[45] Date of Patent: * Dec. 31, 1985

[54] MICROCAPSULE FOR PRESSURE-SENSITIVE RECORDING PAPER AND PROCESS FOR PRODUCING THE SAME

[75] Inventors: Yoshio Okada; Yuriko Igarashi, both of Iwaki, Japan

[73] Assignee: Kureha Kagaku Kogyo Kabushiki Kaisha, Tokyo, Japan

[ * ] Notice: The portion of the term of this patent subsequent to Jul. 17, 2001 has been disclaimed.

[21] Appl. No.: 439,431

[22] Filed: Nov. 5, 1982

[30] Foreign Application Priority Data

Nov. 12, 1981 [JP] Japan ................. 56-181303

[51] Int. Cl.$^4$ ......................... B01J 13/02; B32B 27/20
[52] U.S. Cl. ................. 428/402.21; 264/4.7; 346/215; 428/914
[58] Field of Search ...................... 264/4.7; 428/402.21

[56] References Cited

U.S. PATENT DOCUMENTS

| 3,074,845 | 1/1963 | Geary | 424/32 X |
| 3,516,941 | 6/1970 | Matson | 264/4.7 X |
| 3,607,775 | 9/1971 | Yoshida et al. | 252/316 |
| 3,687,865 | 8/1972 | Katayama et al. | 264/4.3 X |
| 3,778,383 | 12/1973 | Schibler et al. | 264/4.7 X |
| 4,105,823 | 8/1978 | Hasler et al. | 264/4.7 X |
| 4,460,722 | 7/1984 | Igarashi et al. | 264/4.7 X |

FOREIGN PATENT DOCUMENTS

| 46415 | 2/1982 | European Pat. Off. | 264/4.7 |
| 1507739 | 4/1978 | United Kingdom | 264/4.7 |

Primary Examiner—Richard D. Lovering

[57] ABSTRACT

Disclosed herein is a microcapsule for pressure-sensitive recording paper, wherein the microcapsule contains a solution of color-former and has a membranous wall of resin formed by the polycondensation of a water-soluble cationic urea resin with either (i) at least two prepolymers selected from the group consisting of melamine-formaldehyde prepolymer, a thiourea-formaldehyde prepolymer and a melamine-thiourea-formaldehyde prepolymer or (ii) a melamine-thiourea-formaldehyde prepolymer.

9 Claims, No Drawings

MICROCAPSULE FOR PRESSURE-SENSITIVE RECORDING PAPER AND PROCESS FOR PRODUCING THE SAME

BACKGROUND OF THE INVENTION

The present invention relates to a microcapsule for the pressure-sensitive recording paper and a process for producing the same. More precisely, the present invention relates to a microcapsule for pressure-sensitive recording paper, wherein the microcapsule contains a solution of a colour-former and has membranous wall of resin formed by polycondensation of at least two prepolymers selected from a melamine-formaldehyde prepolymer, a thiourea-formaldehyde prepolymer and a melamine-thiourea-formaldehyde prepolymer, or a prepolymer of a melamine-thiourea-formaldehyde prepolymer with a water-soluble cationic urea resin, and to a process for producing a microcapsule for the pressure-sensitive recording paper, wherein a water-soluble cationic urea resin and a prepolymer selected from the group consisting of a mixture of a melamine-formaldehyde prepolymer and a thiourea-formaldehyde prepolymer, a melamine-thiourea-formaldehyde prepolymer and a mixture of a melamine-formaldehyde prepolymer, a thiourea-formaldehyde prepolymer and a melamine-thiourea-formaldehyde prepolymer are polycondensed on the surface of dispersed droplets of a colour-former solution in the presence of an anionic surfactant by adding an acidic catalyst while causing a complex-coacervation between the water-soluble cationic urea resin and the anionic surfactant.

The commonly used pressure-sensitive recording paper is prepared by laminating a CB paper having its under surface coated with a plurality of microcapsules containing a solution of a leuco-type dyestuff (colour former) as a core substance with a CF paper coated with a developer consisting of an acid clay or a resin exhibiting acidity, and the thus prepared pressure-sensitive recording paper is used in a manner wherein the microcapsules are broken by a pressure of hand-writing or typewriting pressure to bring the colour former and the developer into mutual contact thus obtaining the colour-development and recording by the developed colour.

Recently, with the improvement of office efficiency, particularly with the development and the spread of office computers, the pressure-sensitive recording paper has come to be used more and more in various fields, and as a result, its durability under severe use conditions is demanded. Accordingly, a microcapsule having excellent moisture-resistance, heat-resistance and light-fastness has been demanded for a pressure-sensitive recording paper. In addition, in the preparation of the pressure-sensitive recording paper, the microcapsule excellent in solvent-resistance is also demanded.

In this connection, the conventional pressure-sensitive recording paper has been prepared by coating a paper with an aqueous slurry-like dispersion of microcapsules, the dispersion containing a water-soluble binder and some additives. However, in the case where water is used as a dispersion medium, it takes much time to dry the coated paper and the product lacks dimensional stability because of the occurrence of wrinkles on drying.

In order to overcome these problems and improve the productivity of the pressure-sensitive recording paper, the use of a quick drying dispersion medium as the medium for dispersing microcapsules in coating the paper is considered. As a dispersion medium for that purpose, an organic solvent used as a solvent for a printing ink, for instance, alcohols such as isopropyl alcohol and ethanol, esters such as ethyl acetate, ketones such as methyl ethyl ketone, hydrocarbons such as kerosene, toluene and xylene and vegetable oils such as linseed oil and castor oil is suitable.

However, any microcapsule which has been practically used or proposed for use in the pressure-sensitive recording paper cannot remain in the organic solvent in a stable state. In the case where the microcapsule which can exist in such a solvent in stable state is actually prepared, it is possible not only to reduce the time for drying the paper coated with the slurry-like dispersion of microcapsule containing a colour former therewithin in the industrial production of the pressure-sensitive recording paper resulting in a large improvement of productivity but also there will be no fear of causing wrinkles. In addition, the production of partially pressure-sensitive recording paper is easily carried out applying spot printing. Accordingly, a microcapsule which has excellent solvent-resistance is demanded for the pressure-sensitive recording paper.

The term "solvent-resistance" herein means the stability of a microcapsule in an organic solvent.

The membranous wall of microcapsule used for almost all the pressure-sensitive recording papers which are practically used at present is made of gelatine as the main material (hereinafter referred to as gelatine-capsule). Gelatine-capsule has the problem of having poor moisture-resistance, light-fastness and solvent-resistance.

On the other hand, as a substitute for the gelatine-capsule various microcapsules having a hydrophobic high polymer as their material for membranous wall have been proposed, for instance, a urea-formaldehyde resin, a melamine-formaldehyde resin, a polyamide and a polyurethane. These materials are capsulated by in situ polymerization or interface-polymerization. However, although the hitherto proposed microcapsules are improved to a certain extent in moisture-resistance, light-fastness, etc., they are still unsatisfactory as the microcapsule for the pressure-sensitive recording paper, and are poor in solvent-resistance. For instance, as a process for forming the microcapsule solely from a prepolymer consisting of melamine, thiourea and formaldehyde, the process has been proposed wherein a urea-formaldehyde compound as a reactive surfactant or a substance which is derived from melamine-formaldehyde compound and has both hydrophobic group(s) and hydrophilic group(s) is used in combination with the prepolymer(refer to Japanese patent application Laying Open No. 7313/1971). Although the proposed method has overcome some of the problems in preparing gelatine-capsules capsulation is still only possible from a solution of low concentration and the thus prepared microcapsule is poor in stability in the organic solvent as will be described. However, their moisture-resistance and light-fastness, etc. have been improved to a certain extent.

In consideration of these situations, the inventors of the present invention have studied the process for preparing a microcapsule which has excellent solvent-resistance for the pressure-sensitive recording paper while retaining the characteristics of the microcapsule having melamine-thiourea-formaldehyde resin as the membranous wall, that is, the hydrophobicity thereof and availability of raw materials thereof at a low price, and have accomplished the present invention.

The object of the present invention is to provide, microcapsules having the shell thereof mainly composed of melamine-thiourea-formaldehyde resin and suitable for preparing pressure-sensitive recording paper which is far superior in solvent-resistance to the conventional pressure-sensitive recording paper.

DETAILED DESCRIPTION OF THE INVENTION

The microcapsule for the pressure-sensitive recording paper, according to the present invention, contains a solution of a colour-former and has a membranous wall of resin which is characterized in that the membrane wall of resin is formed by polycondensation of at least two prepolymers selected from a melamine-formaldehyde prepolymer, a thiourea-formaldehyde prepolymer and a melamine-thiourea-formaldehyde prepolymer, or a prepolymer of a melamine-thiourea-formaldehyde prepolymer with a water-soluble cationic urea resin. The process for producing a microcapsule for preparing the pressure-sensitive recording paper according to the present invention, is characterized in that a water-soluble cationic urea resin and a prepolymer selected from the group consisting of a mixture of a melamine-formaldehyde prepolymer and a thiourea-formaldehyde prepolymer, a melamine-thiourea-formaldehyde prepolymer and a mixture of a melamine-formaldehyde prepolymer, a thiourea-formaldehyde prepolymer and a melamine-thiourea-formaldehyde are polycondensed on the surface of dispersed droplets of a colour-former solution in the presence of an anionic surfactant by adding an acidic catalyst, while causing a complex-coacervation between the water-soluble cationic urea resin and the anionic surfactant.

In addition, in the preparation of the microcapsule for the pressure-sensitive recording paper according to the present invention, the prepolymer and the water-soluble cationic urea resin are brought into polycondensation while causing the complex-coacervation by the water-soluble cationic urea resin and the anionic surfactant with the addition of an acidic catalyst into the aqueous dispersion to form the hydrophorbic high-polymeric membranous wall which completely covers the dispersed minute droplets of the colour former solution, and thus microencapsulation is obtained.

It is particularly important in the execution of the present invention that the water-soluble cationic urea resin and the anionic surfactant, each substance being mutually opposite in electric charge, are used together with prepolymer. In the case of the polycondensation of the prepolymer, the coexistence of a small amount of both the cationic urea resin and the anionic surfactant gives a stable aqueous dispersion, and at the same time, gives the microcapsules being homogeneous in quality.

The process for preparation of the microcapsule according to the present invention will be explained concretely as follows:

In the first step of the process of the present invention, an aqueous liquid mixture containing a water-soluble cationic urea resin and an anionic surfactant and a solution of a colour former are mixed by an appropriate means (for instance, homogenizer, stirrer, supersonic wave, etc.) to form an emulsion, so that the solution of a colour former forms to minute droplets of 1 to 8 micrometers in diameter. The prepolymer may be introduced into the aqueous liquid mixture in advance of the emulsification, or the prepolymer may be introduced during the emulsification or after completing thereof at a time or at several times with a divided portion. While gently stirring the emulsion containing the prepolymer, the acidic catalyst is added and the whole system is brought into reaction for not less than 2 hours at a temperature of 15° to 60° C. and at a pH 2.5 to 6.0 to finish the microencapsulation. In addition, a suitable amount of water may be added to the system during the reaction.

The prepolymer for use in the present invention is produced from melamine, thiourea and formaldehyde, or from a melamine-formaldehyde prepolymer combined (hereinafter referred to as M/F prepolymer) with a thiourea-formaldehyde prepolymer (hereinafter referred to as TU/F prepolymer). The single use of a melamine-thiourea-formaldehyde prepolymer(-hereinafter referred to as M/TU/F prepolymer) obtained by the reaction of melamine, thiourea and formaldehyde, or the combined use of M/F prepolymer and TU/F prepolymer is adoptable. The M/F prepolymer referred to herein may be any one of the melamines such as mono- to hexamethylol melamine, a mixture of methylol melamines different in the degree of hydroxymethylation or a mixture of melamine, formaldehyde and at least one of the methylol melamines. In addition, a transparent colloidal solution obtained by treating the methylol melamine of a degree of polymerization of 2 to 10 with hydrochloric acid, that is, a solution containing the oligomer obtained by further promoting the reaction between melamine and formaldehyde may be used as M/F prepolymer. M/F prepolymer can be easily obtained by heating a mixture of melamine and an aqueous solution of formaldehyde under a basic condition, and the thus obtained aqueous solution of M/F prepolymer can be served for microencapsulation.

TU/F prepolymer herein may be any one of methylol thioureas such as monomethylol thiourea to tetramethylol thiourea, a mixture of methylol thioureas different in the degree of hydroxymethylation or a mixture of thiourea formaldehyde and at least one of the methylol thioureas. In addition, a solution containing the oligomer obtained by further promoting the reaction between thiourea and formaldehyde, that is, a transparent colloidal solution of methylol thiourea of a degree of polymerization of 2 to 5 provided with hydrophilic groups may be used as TU/F prepolymer.

The molar ratio of the three raw materials, melamine, thiourea and formaldehyde has an important effect on the formation of the membranous wall of the microcapsule. The molar ratio of formaldehyde to melamine is 1.0 to 9.0:1, preferably 1.6 to 7.0:1, and the molar ratio of formaldehyde to thiourea is 0.6 to 4.0:1, preferably 1.0 to 3.0:1 in the present invention. In addition, the molar ratio of melamine to thiourea is at least 0.02. In cases where these molar ratios are in the ranges, respectively, the formation of the membranous wall of the microcapsules is effected uniformly and the membrane having sufficient strength, impermeability and particularly, solvent-resistance is formed.

The amount of the prepolymer in the formation of the microcapsules is preferably 0.1 to 1 g per one gram of a solution of a colour former.

The water-soluble cationic urea resin in the present invention is a urea-formaldehyde resin modified by the introduction thereinto of a cationic modifier, and is easily prepared by polycondensing the U/F prepolymer admixed with tetraethylenepentamine, diaminoethanol, dicyanodiamide, diethylaminoethanol, guanylurea or the like in a publicly known process. The weight ratio of the water-soluble cationic urea resin to the prepolymer is preferably 0.01 to 0.5:1.

The anionic surfactant of the present invention includes, salts of fatty acids, sulfate esters of higher alcohols, and salts of alkylarylsulfonic acid. Sodium dodecylbenzenesulfonate is preferable. A stable aqueous emulsion (dispersion of microcapsules) can be obtained in a broad range of pH 2.5 to 6.0 by using 0.01 to 0.1 part by weight of the anionic surfactant to one part by weight of the water-soluble cationic urea resin.

The acidic catalyst of the present invention includes, carboxylic acids of low molecular weight such as formic acid, acetic acid and citric acid, inorganic acids such as hydrochloric acid, nitric acid and phosphoric acid, or salts showing acidity or which are easy to hydrolyze such as aluminum sulfate, titanium oxychloride, ammonium sulfate, ammonium nitrate and ammonium acetate.

They are used singly or as a mixture thereof.

In the preparation of the microcapsule according to the process of the present invention, as compared to the conventional cases where the aqueous solution containing solely the prepolymer is used, where the combined use of only the prepolymer and the cationic urea resin is carried out, or where the prepolymer is used in combination with a reactive surfactant derived from urea resin (for instance, refer to Japanese patent application Laying-Open No 7313/1971), the emulsifying power of the solution of the colour former is larger so that a stable dispersion at a low viscosity is formed. In addition the impermeability of the membranous wall of the thus prepared microcapsule is remarkably higher than that of the microcapsule obtained by the publicly known processes.

The reason why the process of the present invention has these advantages can be explained due to the complex-coacervation formed between the water-soluble cationic urea resin and the anionic surfactant in a certain composition and pH range. At a fixed composition in the liquid, the formation of the complex coacervate occurs at least in the pH range of 3.5 to 6, and violent coacervation occurs at a pH of around 7 and lower than 3. Accordingly, the emulsifying dispersion of the solution of a colour former is effected in a pH range wherein the formation of coacervate is less in consideration than the prevention of coagulation of particles and then the microencapsulation is caused by reducing pH of the system with an addition of the acidic catalyst. In such a situation, as a result of continuous proceeding of high polymerization of the prepolymer and formation of complex coacervate, a membranous wall of the microcapsule is formed accompanied by simultaneous condensation of the water-soluble cationic urea resin to form hydrophobic high polymer which aids the formation of compact and uniform membranous wall, thus resulting in the desired microcapsules. As has been stated, the microencapsulation according to the present invention is effected while the complex coacervation step and the in situ polymerization step are simultaneously proceeded in combination, and accordingly, it is a novel process not seen in the prior art technique.

The thus obtained microcapsule according to the present invention is composed of a solution of a colour former as the core substance and the uniform and compact membranous wall made of high polymeric substance derived from melamine, thiourea and formaldehyde covering the core substance. As seen in the results of solvent-resistance test shown later, the microcapsule according to the present invention has an excellent solvent-resistance not seen in the microcapsule prepared by the conventional processes. Accordingly, since the microcapsule according to the present invention can be dispersed in an organic solvent as the dispersing medium, the productivity of the pressure-sensitive recording paper can be remarkably improved.

In addition, the colour-former which becomes the core material of the microcapsule according to the present invention can be used in the conventional pressure-sensitive recording paper, and is not particularly restricted. For instance, a solvent for the colour-former solution is alkylnaphthalenes, phenylxylylethanes, alkylbiphenyls, hydrogenated terphenyls, chlorinated paraffin oils, mineral oils and their mixtures.

The present invention will be more precisely explained by referring to Examples as follows.

However, the present invention is not restricted to Examples under mentioned. From the foregoing description, one skilled in the art can easily ascertain the essential characteristics of the present invention, and without departing from the spirit and scope thereof, can make various changes and modifications of the invention to adapt it to various usages and conditions.

EXAMPLE 1

Preparation of a prepolymer

A mixture of 63 g of melamine and 162 g of an aqueous 37 by weight solution of formaldehyde (hereinafter referred to as 37% formalin) adjusted to pH 9.0 was brought into reaction at 70° C., and just after confirming the dissolution of melamine, 225 g of water was added to the mixture and the whole system was stirred for 3 min. to prepare an aqueous solution of a M/F prepolymer (hereinafter referred to as M4F prepolymer, wherein M4F indicates that the molar ratio of formaldehyde to melamine is 4).

Separately, a mixture of 76.1 g of thiourea and 146 g of 37% formalin adjusted to pH 8.5 was brought into reaction at 70° C. for one hour to obtain an aqueous solution of a TU/F prepolymer (hereinafter referred to as TU 1.8 F prepolymer, wherein TU 1.8 F indicates that the molar ratio of formaldehyde to thiourea is 1.8).

Preparation of a cationic urea resin

A mixture of 60 g of urea and 162 g of 37% formalin adjusted to pH 8.8 with an addition of triethanolamine under agitation, was brought into reaction at 70° C. for 30 min. Into 40 g of the thus obtained reaction mixture, 24 g of water and 6 g of tetraethylenepentamine were added, and while stirring the mixture at 70° C., it was adjusted to pH 3 by an addition of aqueous 15% by weight solution of hydrogen chloride and was brought into reaction for one hour. The pH of the reaction mixture was reduced with the proceeding of the reaction, and an aqueous 10% solution of sodium hydroxide was added to adjust the pH to 3, and the reaction temperature was reduced to 55° C. to continue the reaction until the viscosity of the reaction mixture became to 200 cps. Then, the mixture was neutralized by the aqueous 10% solution of sodium hydroxide, and 400 g of water was added to the reaction mixture to obtain an aqueous solution of a cationic urea resin.

Microcapsulation

A mixture of 100 g of aqueous solution of M4F prepolymer, 50 g of aqueous solution of TU 1.8 F prepolymer, 158 g of the aqueous solution of cationic urea resin, 200 g of water and 1 g of triethanolamine was adjusted to pH 5.2 by an addition of aqueous 10% solution of citric acid, and 3 g of aqueous 10% solution of NEOPE-LEX (aqueous solution of sodium alkylbenzene-sulfonate, made by KAO-ATLAS Company) was admixed with the whole system to prepare "Liquid A".

Separately, "Liquid B" was prepared by dissolving 30 g of crystalviolet lactone and 10 g of benzoyl-leucomethylene blue in 960 g of diisopropylnaphthalene, which was one of the solution of the colour formers.

In a homogenizer, "Liquid A" and 150 ml of "Liquid B" were mixed to be an emulsion containing droplets of "Liquid B" of 2 to 3 micrometers in diameter in "Liquid A", and after slowly stirring the emulsion while keeping the temperature thereof at 30° C., it was adjusted to pH 3.6 by an addition of aqueous 10% solution of citric acid. After keeping the emulsion for one hour, 200 g of water was added to the emulsion, and after keeping for further one hour, the emulsion was warmed to 40° C. and stirred for 2 hours. The thus obtained mixture did not exhibit blue coloration when painted on a sheet of CF paper to show the completion of microencapsulation. The thus obtained slurry-like emulsion was passed through a membrane filter, and the residue on the filter was washed with water and dried in a hot wind drier at 35° C. to obtain 35 g of a powdery product of microcapsules.

EXAMPLES 2 to 9

By mixing the M/F prepolymer prepared in the same manner as in Example 1 and the TU/F prepolymer also prepared by the same manner as in Example 1 at a mixing ratio shown in Table 1 and treating the mixture as in Example 1 to obtain a series of dried products of microcapsules. As are seen in Table 1, Examples 8 and 9 are the examples wherein only the weight ratio of membranous wall to core material was changed.

TABLE 1

| | | Composition in Preparation of Microcapsule | | |
|---|---|---|---|---|
| Example | Composition of prepolymer (weight ratio) | Molar ratio of Melamine to Thiourea | Molar ratio of Formaldehyde to the sum of $M^+$ + $TU^{++}$ | Weight ratio of membranous wall material to core material |
| 1 | M4F:TU 1.8F = 2:1 | 0.50 | 2.55 | 0.38 |
| 2 | M4F:TU 1.8F = 2:19 | 0.026 | 1.86 | 0.39 |
| 3 | M4F:TU 1.8F = 1:2 | 0.123 | 2.04 | 0.385 |
| 4 | M4F:TU 1.8F = 8:1 | 1.97 | 3.26 | 0.37 |
| 5 | M8F:TU3F = 8:1 | 1.65 | 6.11 | 0.32 |
| 6 | M3F:TU1F = 2:1 | 0.426 | 1.60 | 0.42 |
| 7 | M4F:TU 1.8F = 38:1 | 9.38 | 3.79 | 0.375 |
| 8 | M4F:TU 1.8F = 2:1 | 0.50 | 2.55 | 0.207 |
| 9 | M4F:TU 1.8F = 2:1 | 0.50 | 2.55 | 0.57 |

Notes:
$M^+$ means mols of melamine
$TU^{++}$ means mols of thiourea

EXAMPLES 10 to 13

A mixture of melamine, thiourea and 37% formalin in a composition shown in Table 2 was adjusted to pH 9.0 by an addition of aqueous 2% solution of sodium hydroxide and stirred for 30 min. at 70° C. to prepare a M/TU/F prepolymer. Into 100 g of the thus prepared solution of a prepolymer, a mixture of 197 g of the cationic urea resin prepared in Example 1, 100 g of water and 1.5 g of triethanolamine adjusted to pH of 5.2 by adding an aqueous 10% solution of citric acid was added and then 3 ml of aqueous 10% solution of EMAL ® AD-25 (ammonium lauryl sulfate, manufactured by KAO-ATLAS Company) was added to the whole system to prepare "Liquid A".

In a homogenizer, 150 ml of the same solution of the colour formers as that prepared in Example 1 ("Liquid B") was emulsified in "Liquid A" as droplets of 2 to 3 micrometers in diameter, and while stirring the emulsion slowly and keeping the temperature thereof at 35° C., the pH thereof was adjusted to 3.6 by addition of aqueous 10% solution of citric acid. Two hours after that, 300 g of water was added to the an emulsion, and then aqueous 10% solution of citric acid was added to the diluted emulsion to adjust the pH thereof to 3.0. The thus adjusted emulsion was stirred for 15 hours. The thus obtained mixture did not exhibit blue color after painting on a sheet of CB paper to show the completion of capsulation. It was dried by the same procedures as in Example 1 to obtain a product of powdery microcapsules.

TABLE 2

| | Composition of Microcapsule Preparation | | | | | |
|---|---|---|---|---|---|---|
| | Species of Prepolymer | | | | | |
| | Composition of raw materials (g) | | | Molar composition | | Weight ratio of membrane to core |
| Example | Melamine | $TU^+$ | $F^{++}$ | M:TU | F:(M + TU)$^{+++}$ | |
| 10 | 8.0 | 4.8 | 87.2 | 1.0 | 8.5 | 0.30 |
| 11 | 20.7 | 12.5 | 66.7 | 1.0 | 2.5 | 0.39 |
| 12 | 30.0 | 60.2 | 64.0 | 3.0 | 2.5 | 0.40 |

TABLE 2-continued

| | Composition of Microcapsule Preparation | | | | | |
|---|---|---|---|---|---|---|
| | Species of Prepolymer | | | | | |
| | Composition of raw materials (g) | | | Molar composition | | Weight ratio of membrane |
| Example | Melamine | TU+ | F++ | M:TU | F:(M + TU)+++ | to core |
| 13 | 34.2 | 29.5 | 62.9 | 7.0 | 2.5 | 0.40 |

Notes:
TU+ means thiourea
F++ means 37% formalin
F:(M + TU)+++ means the ratio of mols of 37% formalin divided by the sum of mols of melamine and mol of thiourea.

COMPARATIVE EXAMPLES 1 and 2

Using 10 g of M4F prepolymer and 5 g of TU 1.8 F prepolymer both prepared by the same manner as in Example 1, and using a third component shown in Table 3 (in Comparative Example 2) instead of the water-soluble cationic urea resin and NEOPELEX, or using nothing (in Comparative Example 1), 15 ml of the solution of the same colour formers as in Example 1 was dispersed under the same conditions as in Example 1 to obtain the emulsion.

While slowly stirring the thus prepared emulsion, its pH was adjusted to 3.8 by adding an aqueous 10% solution of citric acid, and one hour after that, 30 ml of water added to the emulsion followed by 2 hours-stirring to finish the microencapsulation.

In spite of the trial of filtering the slurry-like emulsion prepared in Comparative Example 2 through the membrane filter, the emulsion could not be filtered, and after drying the emulsion, a block-like material was obtained. After directly spray-drying the emulsion, dried microcapsules suitable for preparing the pressure-sensitive recording paper of 1 to 20 micrometers in diameter could not be obtained. The result of solvent-resistance test was very poor as is shown in Table 4.

TABLE 3

| Comparative Example | Third component | Appearance and property of microcapsules |
|---|---|---|
| 1 | none | diameter was very large and distributed in a wide range |
| 2 | 20% solution of a reactive surfactant[1] 4 g | strongly coagulating |

Note: [1]The reactive surfactant shown in Preparative Method IV of Japanese Patent Application Laying-Open SHO 46-7313/1971.

EXAMPLE 14 (Examination of Solvent-resistance)

Each one of the dried powdery microcapsules respectively prepared in Examples 1 to 13 and Comparative Examples 1 and 2 was accurately collected in an amount of 10 g, and after grinding down to fine powders in a mortar, 200 ml of toluene was added thereonto, and after stirring the mixture well and leaving still for while, the supernatant liquid was put aside, and the residue was again ground in the mortar followed by adding 200 ml of toluene thereonto and stirring the mixture. The toluene extracts and toluene washings of the mortar and the pestle was introduced into a 500 ml mess flask, and after making the total volume to 500 ml by adding toluene, the amount of diisopropylnaphthalene in the toluene solution was determined by gas chromatography, the amount being A grams.

Separately, each 10 g of accurately weighed microcapsules respectively prepared in Examples 1 to 13 and Comparative Examples 1 and 2 was introduced into a 100 ml glass stoppered flask, and after introducing 50 g of each of ethanol, toluene and isopropyl alcohol, the flask was stoppered and well shaken followed by leaving still for 24 hours at a room temperature. Then the microcapsules were filtered off and washed well with the solvent used. By following the procedures used for obtaining the amount of A, the amount of diisopropylnaphthalene in the thus filtered microcapsule was determined by gas chromatography, the amount being B grams. The rate of holding the core substance (R) after immersing the microcapsules in the solvent was obtained from the following formula:

$$R(\%) = B/A \times 100$$

The higher the rate of holding (R), the better the solvent-resistance of the microcapsule. The test results are shown in Table 4.

TABLE 4

| | Solvent-Resistance | | |
|---|---|---|---|
| | | | Unit: percentage |
| | Solvent-resistance (Rate of holding core substance) | | |
| | Ethanol | Toluene | Isopropyl alcohol |
| Example No. | | | |
| 1 | 99.5 | 99.6 | 99.8 |
| 2 | 80.1 | 83.2 | 82.9 |
| 3 | 85.3 | 87.1 | 90.0 |
| 4 | 99.3 | 99.7 | 99.9 |
| 5 | 96.8 | 97.7 | 98.6 |
| 6 | 80.2 | 81.6 | 81.5 |
| 7 | 99.5 | 99.8 | 99.9 |
| 8 | 95.4 | 97.2 | 98.0 |
| 9 | 100.0 | 100.0 | 100.0 |
| 10 | 77.3 | 79.5 | 80.2 |
| 11 | 99.4 | 99.5 | 99.9 |
| 12 | 99.6 | 99.9 | 99.9 |
| 13 | 99.5 | 99.8 | 99.9 |
| Comparative Example No. | | | |
| 1 | 12.0 | 13.3 | 14.1 |
| 2 | 20.2 | 23.0 | 16.7 |

What is claimed is:

1. A process for preparing microcapsules for pressure-sensitive recording paper, which process comprises polycondensing a water-soluble cationic urea resin with either:
   (i) at least two prepolymers selected from the group consisting of a melamine-formaldehyde prepolymer, a thiourea-formaldehyde prepolymer, and a melamine-thiourea-formaldehyde prepolymer; or
   (ii) a melamine-thiourea-formaldehyde prepolymer, on the surface of droplets of a color-former dispersed in an aqueous medium, the polycondensation being effected in the presence of an anionic surfactant selected from the group consisting of salts of fatty acids, sulfate esters of higher alcohols and salts of alkylarylsulfonic acid and also in the presence of an acidic catalyst while causing a complex-coacervation between the water-soluble cationic urea resin and the anionic surfactant.

2. A process according to claim 1, wherein the molar ratio of melamine to thiourea in the prepolymer is at least 0.02.

3. A process according to claim 2, wherein the weight ratio of the water-soluble cationic urea resin to the anionic surfactant in the aqueous dispersion is 1:0.01 to 1:0.1.

4. A process according to claim 2, wherein the weight ratio of the prepolymer to the resin component of the water-soluble cationic urea resin in the aqueous dispersion is in a range of 1:0.01 to 1:0.5.

5. A process according to claim 1, wherein the weight ratio of the water-soluble cationic urea resin to the anionic surfactact in the aqueous dispersion is 1:0.01 to 1:0.1.

6. A process according to claim 5, wherein the weight ratio of the prepolymer to the resin component of the water-soluble cationic urea resin in the aqueous dispersion is in a range of 1:0.1 to 1:0.5.

7. A process according to claim 1 wherein the weight ratio of the prepolymer to the resin component of the water-soluble cationic urea resin in the aqueous dispersion is in a range of 1:0.1 to 1:0.5.

8. Microcapsule suitable for pressure-sensitive recording paper comprising:
   (a) a color-former solution; and
   (b) a membranous wall wherein said membranous wall encapsulates said color-former solution and said membranous wall is formed by the polycondensation of a water-soluble cationic urea resin, and a reactant selected from the group consisting of:
      (i) at least two prepolymers selected from the group consisting of:
         (A) melamine-formaldehyde prepolymer;
         (B) thiourea-formaldehyde prepolymer; and
         (C) melamine-thiourea-formaldehyde prepolymer; or
      (ii) melamine-thiourea-formaldehyde, wherein said polycondensation reaction is conducted in the presence of an anionic surfactant selected from the group consisting of salts of fatty acid, sulfate esters of higher alcohols and salts of alkylarylsulfonic acid, and also in the presence of an acid catalyst.

9. Microcapsule according to claim 8, wherein the molar ratio of melamine to thiourea is at least 0.02 in the prepolymer.

* * * * *

UNITED STATES PATENT AND TRADEMARK OFFICE
CERTIFICATE OF CORRECTION

PATENT NO. : 4,562,116
DATED : December 31, 1985
INVENTOR(S) : Yoshio Okada and Yuriko Igarishi It is certified that error appears in the above-identified patent and that said Letters Patent is hereby corrected as shown below:

In Column 2, line 21, after"out" insert --by--.

In Column 2, line 57, change "capsules capsulation" to --capsules, capsulation--.

In Column 3, line 45, change "hydrophorbic" to --hydrophobic--.

In Column 4, line 42, change "thiourea formaldehyde" to --thiourea, formaldehyde--.

In Column 5, line 31, change " No 7313" to --No. 7313--.

In Column 5, line 34, change "tion the" to --tion, the--.

In Column 6, line 32, change "37 by weight" to --37% by weight--.

In Column 11, line 22, change "surfactact" to --surfactant--.

Signed and Sealed this

Nineteenth Day of August 1986

[SEAL]

Attest:

DONALD J. QUIGG

Attesting Officer

Commissioner of Patents and Trademarks